United States Patent [19]

Dumas

[11] 4,279,794

[45] Jul. 21, 1981

[54] SIZING METHOD AND SIZING COMPOSITION FOR USE THEREIN

[75] Inventor: David H. Dumas, Wilmington, Del.

[73] Assignee: Hercules Incorporated, Wilmington, Del.

[21] Appl. No.: 106,606

[22] Filed: Dec. 26, 1979

Related U.S. Application Data

[60] Division of Ser. No. 33,618, Apr. 26, 1979, abandoned, which is a continuation of Ser. No. 875,663, Feb. 6, 1978, abandoned.

[51] Int. Cl.$^3$ .............................................. C08L 63/00
[52] U.S. Cl. ........................ 260/29.2 EP; 260/29.2 N
[58] Field of Search ............... 162/164 GP, 158, 179, 162/168 R, 168 N, 180; 526/23, 49, 53, 56, 310; 260/29.4 R, 29.2 EP, 29.2 N; 427/391

[56] References Cited

FOREIGN PATENT DOCUMENTS 999300 11/1976 Canada .

Primary Examiner—Peter Chin

[57] ABSTRACT

Disclosed is a method for sizing paper wherein the sizing agent employed is a hydrophobic cellulose reactive sizing agent such as a ketene dimer sizing agent. There is employed in combination with the sizing agent a novel sizing accelerator whereby off-the-machine sizing is improved substantially. Disclosed also is a novel sizing composition comprised of the sizing agent and the accelerator, the accelerator being a poly(diallylamine)epihalohydrin resin.

4 Claims, No Drawings

SIZING METHOD AND SIZING COMPOSITION FOR USE THEREIN

This is a division of application Ser. No. 33,618, filed Apr. 26, 1979 abandoned. Application Ser. No. 33,618 is a continuation of application Ser. No. 875,663, filed Feb. 6, 1978, now abandoned.

This invention relates to the production of sized paper and sized paperboard.

In particular, this invention relates to the manufacture of sized paper and sized paperboard wherein the sizing agent employed is a hydrophobic cellulose reactive sizing agent such as a ketene dimer sizing agent and there is employed in combination therewith a new sizing accelerator to provide substantially higher off-the-machine sizing than when the cellulose reactive sizing agent is used alone.

U.S. Pat. No. 3,840,486 discloses water-soluble, thermosettable resinous compositions derived by reaction of dicyandiamide, an ammonium salt, formaldehyde, and an acid salt of a water-soluble aminopolyamide such as the water-soluble aminopolyamide derived by reaction of adipic acid and diethylenetriamine. The resinous compositions of U.S. Pat. No. 3,840,486 accelerate the sizing imparted to paper by cellulose reactive sizing agents such as ketene dimers, acid anhydrides, and isocyanates. By employing the resinous compositions of U.S. Pat. No. 3,840,486 in combination with the above sizing agents for paper, higher off-the-machine sizing is provided than when using equivalent amounts of the sizing agent alone.

United Kingdom Pat. No. 1,373,788 discloses the use of dicyandiamide-formaldehyde condensates as sizing accelerators for ketene dimer sizing agents.

U.S. Pat No. 3,409,500 discloses a process for the manufacture of sized paper which comprises separately adding an aqueous anionic dispersion of hydrophobic organic cellulose-reactive paper sizing carboxylic anhydride particles to an aqueous suspension of cellulose papermaking fibers and a water-soluble cellulose-substantive cationic polyamine having a molecular weight in excess of 1,000, the amount of said polyamine being at least sufficient to deposit said anhydride particles on said fibers and to accelerate the rate at which said anhydride develops its sizing properties on cellulose fibers at 190° F.–240° F., sheeting said suspension to form a water-laid web, and drying said web at a temperature between 190° F. and 250° F.

In U.S. Pat. No. 3,409,500, at column 3, lines 61–70, it is stated that among the most efficient cationic polymers are the adipic acid-polyalkylenepolyamide-epichlorohydrin polymers, prepared by condensing adipic acid with a polyalkylene-polyamine thereby forming a polyamidepolyamine, and reacting this polymer with epichlorohydrin. Methods for the preparation of agents of this type are disclosed in U.S. Pat. Nos. 2,926,116, 2,926,154 and 3,329,657.

The cationic polymers of U.S. Pat. Nos. 2,926,116 and 2,926,154 are disclosed in U.S. Pat. No. 3,483,077 as being useful retention aids for ketene dimer sizing agents whereby sizing is improved as compared to cationic starch retention aid.

U.S. Pat. No. 3,575,796 discloses a method for the sizing of paper and paperboard products which comprises intimately dispersing within the aqueous pulp slurry, or applying to a prepared paper web, an aqueous emulsion of an N-substituted aziridine compound which is prepared by means of the reaction between a carbonyl-substituted, alpha, beta-ethylenically unsaturated compound such as distearyl maleate and an alkyleneimine such as ethyleneimine. The sizing agent can be uniformly dispersed with a cationic emulsifier, such as a cationic starch, for better retention on the fibers. Column 4, lines 1–44 of U.S. Pat. No. 3,575,796 discloses other cationic agents for use in aiding in the retention of the sizing agents of the invention among which are cationic thermosetting resins such as the reaction products of dibasic acids, polyalkylenepolyamines and epihalohydrins. It is stated also at column 4, lines 45–62, that the cationic agents are also useful as emulsifiers for the sizing agent.

U.S. Pat. No. 3,666,512 discloses compositions comprising hydrophobic cellulose-reactive paper-sizing carboxylic acid anhydrides and a catalyst which accelerates the rate at which the anhydride develops its sizing properties when deposited on cellulose from aqueous medium and heated. The catalyst or promoter for the anhydride size is a water-soluble cationic salt of a cellulose-substantive water-soluble polyamine. Suitable cationic agents are set forth in the table in column 7 of the patent. Among the cationic agents is an aminopolyamide—epichlorohydrin resin, the aminopolyamide being derived from diethylenetriamine and adipic acid.

Canadian Pat. No. 873,777 discloses a method for improving the wet strength, dry strength, and resistance to penetration by liquids of unsized paper comprising imbibing the paper with an amine oxide capable of swelling the paper fibers and a ketone dimer paper sizing agent, heating the paper to swell the paper fibers and removing the amine oxide from the paper.

U.S. Pat. No. 3,046,186 relates to the manufacture of sized paper by the beater-addition process wherein an aqueous cationic dispersion of a hydrophobic ketene dimer is added to an aqueous suspension of cellulosic fibers. The sized paper is manufactured by forming an aqueous suspension of cellulose papermaking fibers and adding thereto an emulsion of a hydrophobic ketene dimer in an aqueous medium containing a cationic dispersing agent which may be a monomeric or high molecular weight hydrophilic or water-soluble basic nitrogenous surface-active agent. The dispersing agents are set forth in columns 3 and 4 of U.S. Pat. No. 3,046,186.

U.S. Pat. No. 3,006,806 discloses the conjoint use of an organic cationic polymer with a ketene dimer in the sizing of paper. Cationic polymers disclosed are melamine-formaldehyde resins (as described in U.S. Pat. No. 2,345,543 to Wohnsiedler and Thomas and U.S. Pat. No. 2,559,220 to Maxwell and Landes); urea-formaldehyde resins (as described in U.S. Pat. No. 2,697,132 to Daniel, Landes and Suen); cationic corn starch; guanidine-formaldehyde resins (U.S. Pat. No. 2,745,744 to Weidner and Dunlap); alkylenepolyamine-halohydrin resins (as described in U.S. Pat. No. 2,601,597 to Daniel, Wilson and Landes); and cationic urea-formaldehyde resins (as described in British Pat. Nos. 675,477 and 677,184).

U.S. Pat. No. 3,084,092 relates to paper manufactured by the conjoint use of an amino resin and a hydrophobic organic isocyanate. Amino resins disclosed in U.S. Pat. No. 3,084,092 and polyfunctional halohydrin resins of Daniel et al, U.S. Pat. No. 2,595,935; the dicyandiamide-formaldehyde-amine polymers of Dudley et al, U.S. Pat. No. 2,596,014; the urea-mono-substituted urea resins of Schiller et al, U.S. Pat. No. 2,698,737; the polyamine-polyamide linear polymers of House et al, U.S. Pat. No. 2,729,560; the polymers formed by copolymerizing acrylamide and acrylic acid in 0:1 molar ratio; the sulfonated dimethylolurea resins of U.S. Pat. No. 2,582,840; and the aminosulfuric acid-melamine-formaldehyde resins of U.S. Pat. No. 2,683,607.

In accordance with this invention, applicant has found new sizing accelerators for use with hydrophobic cellulose reactive sizing agents such as ketene dimers, acid anhydrides, and organic isocyanates.

The sizing accelerators used in this invention are poly(diallylamine)-epichlorohydrin resins as disclosed and described in U.S. Pat. No. 3,700,623. The disclosures of this patent are incorporated herein by reference.

The poly(diallylamino)-epihalohydrin resins used in this invention comprise the resinous reaction product of (A) a linear polymer having units of the formula

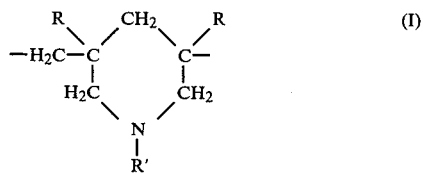

where R is hydrogen or lower alkyl and R' is hydrogen, alkyl or a substituted alkyl group and (B) an epihalohydrin.

In the above formula, each R can be the same or different and, as stated, can be hydrogen or lower alkyl. The alkyl groups contain from 1 to 6 carbons and are preferably methyl, ethyl, isopropyl n-butyl. R' of the formula represents hydrogen, alkyl or substituted alkyl groups. The R' alkyl groups will contain from 1 to 18 carbon atoms (preferably from 1 to 6 carbon atoms) such as methyl, ethyl, propyl, isopropyl, butyl, tert-butyl, hexyl, octyl, decyl, dodecyl, tetradecyl, and octadecyl. R' can also be a substituted alkyl group. Suitable substituents include, in general, any group which will not interfere with polymerization through a vinyl double bond. Typically, the substituents can be carboxylate, cyano, ether, amino (primary, secondary or tertiary), amide, hydrazide and hydroxyl.

Polymers having units of the above formula can be produced by polymerizing the hydrohalide salt of a diallylamine

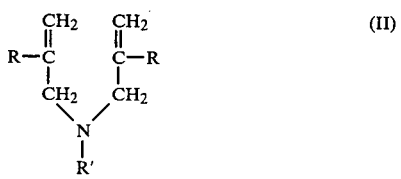

where R and R' are as indicated above, either alone or as a mixture with other copolymerizable ingredients, in the presence of a free radical catalyst and then neutralizing the salt to give the polymer free base.

Specific hydrohalide salts of the diallylamines which can be polymerized to provide the polymer units of the invention include diallylamine hydrochloride; N-methyldiallylamine hydrobromide; 2,2'-dimethyl-N-methyldiallylamine hydrochloride; N-ethyldiallylamine hydrobromide; N-isopropyldiallylamine hydrochloride; N-n-butyldiallylamine hydrobromide; N-tert-butyldiallylamine hydrochloride; N-n-hexyldiallylamine hydrochloride; N-octadecyldiallylamine hydrochloride; N-acetamidodiallylamine hydrochloride; N-cyanomethyldiallylamine hydrochloride; N-β-propionamidodiallylamine hydrobromide; N-carboethoxymethyldiallylamine hydrochloride; N-β-methoxyethyldiallylamine hydrobromide; N-β-aminoethyldiallylamine hydrochloride; N-hydroxyethyldiallylamine hydrobromide; and N-acetohydrazide substituted diallylamine hydrochloride.

In preparing the homopolymers and copolymers for use in this invention, reaction can be initiated by redox catalytic system. In a redox system, the catalyst is activated by means of a reducing agent which produces free radicals without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specific example of such a sulfate is ferrous sulfate. The use of a redox initiator system has several advantages, the most important of which is efficient polymerization at lower temperatures. Conventional peroxide catalysts such as tertiary-butyl hydroperoxide, potassium persulfate, hydrogen peroxide, and ammonium persulfate used in conjunction with the above reducing agents or metal activators, can be employed.

As stated above, the linear polymers of diallylamines can contain different units of formula (I) and/or contain units of one or more other copolymerizable monomers. Typically, the comonomer is a different diallylamine; a monoethylenically unsaturated compound containing a single vinyl or vinylidene group; or sulfur dioxide, and is present in an amount ranging from 0 to 95 mole percent of the polymer. Thus the polymers of diallylamine are linear polymers wherein from 50 to 100% of the recurring units have the formula (I) and from 0 to 95% of the recurring units are monomer units derived from (1) a vinyl or vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones such as methyl vinyl ketone and ethyl vinyl ketone, vinyl sulfonamide, sulfur dioxide or a different diallylamine embraced by the above formula (II).

Specific copolymers which can be reacted with an epihalohydrin include copolymers of N-methyldiallylamine and sulfur dioxide; copolymers of N-methyldiallylamine and diallylamine; copolymers of diallylamine and acrylamide; copolymers of diallylamine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The poly(diallylamine)-epihalohydrin resin can be prepared by reacting a homopolymer or copolymer of a diallylamine as set forth above with an epihalohydrin at a temperature of from about 30° C. to about 80° C. and preferably from about 40° C. to about 60° C. until the viscosity measured on a solution containing 20% to 30% solids at 25° C. has reached a range of A to B and preferably about C to D on the Gardner-Holdt scale. The reaction is preferably carried out in aqueous solution to moderate the reaction, and at a pH of from about 7 to about 9.5.

When the desired viscosity is reached, sufficient water is added to adjust the solids content of the resin solution to about 15% or less and the product cooled to room temperature (about 25° C.).

The resin solution can be stabilized against gelation by adding to the aqueous solution thereof sufficient water-soluble acid (such as hydrochloric acid and sulfuric acid) to obtain and maintain the pH at about 2. The resulting acid-stabilized resin solution can be used as such in carrying out this invention or, if desired, it may be reactivated by known means prior to use. Such acid-stabilized resin solutions and means of reactivating same are disclosed and described in U.S. Pat. No. 3,833,531. The disclosures of this patent are incorporated herein by reference.

Prior to stabilization against gelation the resin of the solution, which is in its active or easily crosslinkable form can be represented as follows

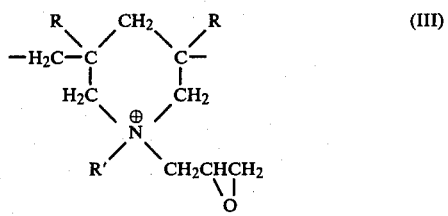
(III)

When stabilized against gelation, by HCl for example, the

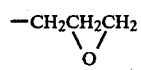

of (III) becomes

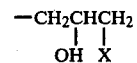

(IV) where X is halogen such as chlorine. On reactivation of resin, by addition of aqueous NaOH to the resin solution for example, (IV) reverts to the epoxide form shown in (III).

The

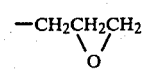

of (III) can be converted, is desired, to

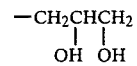

(V) by adding sodium bicarbonate to the solution of (III) and heating the resulting solution at about 100° C. for about 1½ hours. In form (V) the resin will not crosslink nor can it be reconverted to (III). It is in glycol form and is an inert cationic polymer.

All forms of the resin as above shown can be used in this invention and the expression poly(diallylamine)-epihalohydrin resin as used herein and in the claims includes all resins wherein the epihalohydrin moiety in the form shown in (III), (IV), and (V). Thus, the resin used in this invention can be represented as follows:

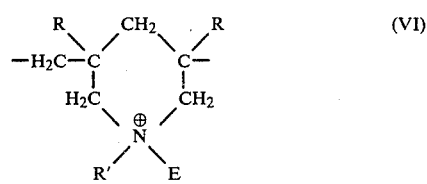
(VI)

where E is

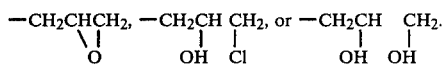

The following examples illustrate the preparation of the poly(diallylamine)-epichlorohydrin resins used in this invention.

In all examples in this specification, parts and percentages are by weight unless otherwise specified.

EXAMPLE 1

A solution of 69.1 parts of N-methyldiallylamine and 197 parts of 20° Be hydrochloric acid in 111.7 parts of demineralized water was sparged with nitrogen to remove air, then treated with 0.55 part of tertiary butyl hydroperoxide and a solution of 0.0036 part of ferrous sulfate in 0.5 parts of water. The resulting solution was allowed to polymerize at 60°-69° C. for 24 hours to give a polymer solution containing about 52.1% solids with an RSV of 0.22. 122 Parts of the above solution was adjusted to pH 3.5 by the addition of 95 parts of 3.8% sodium hydroxide and then diluted with 211 parts of water and combined with 60 parts of epichlorohydrin. The mixture was heated at 45°-55° C. for 1.35 hours, until the Gardner-Holdt viscosity of a sample, cooled to 25° C., reached B+. The resulting solution was acidified with 25 parts of 20° Be hydrochloric acid and heated at 60° C. until the pH became constant at 2.0. The resulting resin solution had a solids content of 20.8% and a Brookfield viscosity=77 cps. (measured using a Brookfield Model LVF Viscometer, No. 1 spindle at 60 r.p.m. with guard).

EXAMPLE 2

25 Parts of a 9.58% solids solution of resin prepared in accordance with Example 1 was combined with a solution of 1.62 parts of 10 N sodium hydroxide in 11.25 parts of water and aged 0.5 hour.

EXAMPLE 3

150 Parts of a 20% solids solution of resin prepared in accordance with Example 1 was diluted with 172.5 parts water. To the solution was then added a solution of 7.2 parts NaOH in 160 parts water. The resulting solution was allowed to stand for 5 minutes and then there was added thereto 10.5 parts NaHCO$_3$. The solution was then heated to reflux and refluxed for 1.5 hours and then cooled to room temperature. The resulting solution had a solids (modified resin) content of 9.2% and a Brookfield viscosity=77 cps. (measured using Brookfield Model LVF Viscometer, No. 1 spindle at 60 r.p.m. with guard).

The sizing accelerators of this invention are employed in combination with hydrophobic cellulose reactive sizing agents such as ketene dimers, acid anhydrides, and isocyanates. These sizing agents are well known in the art and are usually employed as aqueous emulsions. The term "emulsion" is used herein, as is customary in the art, to mean either a dispersion of the liquid-in-liquid type or of the solid-in-liquid type.

Hydrophobic acid anhydrides useful as cellulose reactive sizing agents for paper include (A) rosin anhydride (see U.S. Pat. No. 3,582,464); (B) anhydrides having the structure

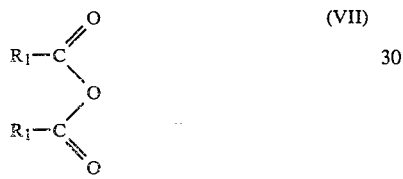
(VII)

where R$_1$ is a saturated or unsaturated hydrocarbon radical, the hydrocarbon radical being a straight or branched chain alkyl radical, an aromatic substituted alkyl radical, or an alkyl substituted aromatic radical so long as the hydrocarbon radical contains a total of from about 14 to 36 carbon atoms; and (C) cyclic dicarboxylic acid anhydrides having the structure

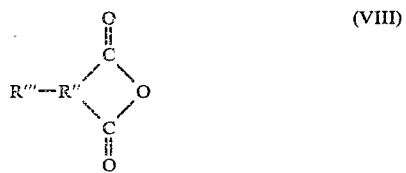
(VIII)

where R'' represents a dimethylene or trimethylene radical and where R''' is a hydrocarbon radical containing more than 7 carbon atoms which are selected from the group consisting of alkyl, alkenyl, aralkyl or aralkenyl. Substituted cyclic dicarboxylic acid anhydrous falling within the above formula (VIII) are substituted succinic and glutaric anhydrides. In formula (VII) above each R$_1$ can be the same hydrocarbon radical or each R$_1$ can be a different hydrocarbon radical.

Specific examples of anhydrides of formula (VII) are myristoyl anhydride; palmitoyl anhydride; oleoyl anhydrides; and stearoyl anhydride.

Specific examples of anhydrides of formula (VIII) are isooctadecenyl succinic acid anhydride; n-hexadecenyl succinic acid anhydride; dodecyl succinic acid anhydride; decenyl succinic acid anhydride; ectenyl succinic acid anhydride; and heptyl glutaric acid anhydride.

Hydrophobic organic isocyanates used as sizing agents for paper are well known in the art. Best results are obtained when the hydrocarbon chains of the isocyanates contain at least 12 carbon atoms, preferably from 14 to 16 carbon atoms. Such isocyanates include rosin isocyanate; dedecyl isocyanate; octadecyl isocyanate; tetradecyl isocyanate; hexadecyl isocyanate; eicosyl isocyanate; docosyl isocyanate; 6-ethyldecyl isocyanate; 6-phenyldecyl isocyanate; and polyisocyanates such as 1,18-octadecyl diisocyanate and 1,12-dodecyl diisocyanate, wherein one long chain alkyl group serves two isocyanate radicals and imparts hydrophobic properties to the molecule as a whole.

Ketene dimers used as cellulose reactive sizing agents are well known in the art and are dimers having the formula

(IX)

where R$_2$ is a hydrocarbon radical, such as alkyl having at least 8 carbon atoms, cycloalkyl having at least 6 carbon atoms, aryl, aralkyl and alkaryl. In naming ketene dimers, the radical "R$_2$" is named followed by "ketene dimer". Thus, phenyl ketene dimer is

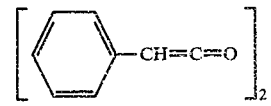

benzyl ketene dimer is:

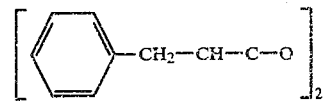

and decyl ketene dimer is: $[C_{10}H_{21}—CH=C=O]_2$. Examples of ketene dimers include octyl, decyl, dodecyl, tetradecyl, hexadecyl, octadecyl, eicosyl, decosyl, tetracosyl, phenyl, benzyl beta-naphthyl and cyclohexyl ketene dimers, as well as the ketene dimers prepared from montamic acid, naphthenic acid, Δ9,10-decylenic acid, Δ9,10-dodecylenic acid, palmitoleic acid, oleic acid, ricinoleic acid, linoleic acid, linoleric acid, and eleostearic acid, as well as ketene dimers prepared from naturally occurring mixtures of fatty acids, such as those mixtures in coconut oil, babassu oil, palm kernel oil, palm oil, olive oil, peanut oil, rape oil, beef tallow, lard (leaf) and whale blubber. Mixtures of any of the above-named fatty acids with each other may also be used.

The following examples show the preparation of ketene dimer emulsions.

EXAMPLE 4

An emulsion of an alkyl ketene dimer prepared from a mixture of palmitic and stearic acids was prepared by admixing 880 parts of water, 60 parts of cationic corn starch and 10 parts of sodium lignin sulfonate. The mixture was adjusted to pH of about 3.5 with 98% sulfuric acid. The resulting mixture was heated at 90°–95° C. for about one hour. Water was then added to the mixture in an amount sufficient to provide a mixture of 1750 parts (total weight). About 240 parts of the ketene dimer was stirred into the mixture together with 2.4 parts of thiadiazine. The thiadiazine was used as a preservative. The resulting premix (at 65° C.) was homogenized in one pass through an homogenizer at 4000 p.s.i. The homogenized product was diluted with water to a ketene dimer solids content of about 6%.

EXAMPLE 5

Example 4 was repeated with the exception that the alkyl ketene dimer of oleic acid was used in place of the alkyl ketene dimer prepared from a mixture of palmitic and stearic acids.

EXAMPLE 6

A portion of the emulsion of Example 4 was diluted, with water, to a ketene dimer solids content of 0.10%.

EXAMPLE 7

A portion of the emulsion of Example 5 was diluted, with water, to a ketene dimer solids content of 0.10%.

EXAMPLE 8

Products prepared in accordance with Example 1 and Example 4 were combined, with addition of water as required, to provide an aqueous sizing composition comprised of 0.10% ketene dimer and 0.20% resin.

EXAMPLE 9

Products prepared in accordance with Example 1 and Example 4 were combined, with addition of water as required, to provide an aqueous sizing composition comprised of 0.10% ketene dimer and 0.10% resin.

EXAMPLE 10

Products prepared in accordance with Example 2 and Example 4 were combined, with addition of water as required, to provide an aqueous sizing composition comprised of 0.10% ketene dimer and 0.10% acid stabilized resin.

EXAMPLE 11

Products prepared in accordance with Example 3 and Example 4 were combined, with addition of water as required, to provide an aqueous sizing composition comprised of 0.10% ketene dimer and 0.10% modified resin.

EXAMPLE 12

Products prepared in accordance with Example 1 and Example 5 were combined, with addition of water as required, to provide an aqueous sizing composition comprised of 0.10% ketene dimer and 0.10% resin.

The above sizing compositions were applied to the surface of a sheet of 40 lb./3000 ft.$^2$ waterleaf paper. The sheet was made from a 50:50 hardwood:softwood pulp blend on a pilot paper machine. Each sizing composition was adjusted to pH 7 before application to the sheet in the nip of a horizontal size press. The size press ran at 40 ft./min. and the wet pick up was 70%. Retention of the ketene dimer size was the same in all of these runs. The sized sheets were dried at 200° F. for 20 sec. on a laboratory drum drier to 4% moisture. The size was measured by the Hercules Size Test with test solution No. 2 to the indicated reflectance. The off-machine data were obtained within two minutes of drying and the natural aged data after at least 3 days storage at room temperature. It is known in the art that ketene dimer size develops substantially all its sizing properties in the paper in 3 days. After this time the size properties of the paper remain essentially the same.

Size results are set forth in Table I below.

TABLE 1

| Sizing Composition of Example | | Hercules Size Test | |
|---|---|---|---|
| | | Off-the Machine to 80% Reflectance (Seconds) | Material Aged to 85% Reflectance (Seconds) |
| 6 | separate | 0 | 331 |
| 6 | tests | 0 | 400 |
| 7 | | 0 | 554 |
| 8 | 2 separate | 310 | 350 |
| 8 | tests | 305 | — |
| 9 | 2 separate | 335 | 450 |
| 9 | tests | 100 | 436 |
| 10 | | 437 | 590 |
| 11 | | 250 | 900 |
| 12 | | 315 | 500 |

The following examples show the improvement in off-the-machine sizing when the sizing compositions of this invention are used in internal sizing.

Handsheets of 40 lb./3000 ft.$^2$ were made on a Noble and Wood handsheet apparatus using a pulp consisting of 30% waste news, 35% Rayonier bleached softwood, and 35% Weyerhauser bleached kraft hardwood. Sheets were dried for 45–50 sec. at 215° F. the size accelerator resin, in aqueous solution, was added to the aliquot where the pulp consistency was about 0.275% and stirred for 15 seconds and then the ketene dimer size emulsion was added followed by stirring for another 15 seconds. This was then diluted, with water, to a pulp consistency of about 0.025% in the deckle box prior to sheet formation. The amounts of accelerator resin used and ketene dimer used are shown in Table II below and are based on the dry weight of the pulp.

Test results are shown in Table II below.

TABLE II

| Example No. | Accelerator Resin of Example 1 | Ketone Dimer Emulsion of Example 4 | Hercules Size Test to 80% Reflectance | |
|---|---|---|---|---|
| | | | Off-the-Machine | Natural Aged |
| 13 | none | 0.15% ketone dimer | 0 | 300 |
| 14 | .15% | 0.15% ketone dimer | 16 | 303 |
| 15 | .30% | 0.15% ketone dimer | 78 | 464 |
| 16 | .45% | 0.15% ketone dimer | 154 | 594 |

In Examples 13, 14, 15, and 16 the accelerator resin and the sizing agent were added separately. It is to be understood that they can be admixed to provide a sizing composition, as in surface sizing, prior to addition to a pulp slurry, and sized sheets prepared from the thus treated slurry.

EXAMPLE 17

An aqueous emulsion of octadecyl isocyanate (stearyl isocyanate) sizing agent was used in the internal sizing of a handsheet using a furnish of 50% hardwood kraft:50% softwood kraft with 10% clay and 10% calcium carbonate as fillers. Cationic starch (Stalok 400), 35% based on the dry weight of the pulp, was added as a retention aid for the fillers. The amount of octadecyl isocyanate used as sizing agent was 0.2% based on the dry weight of the fibers.

EXAMPLE 18

Example 17 was repeated with the exception that resin prepared in accordance with Example 1, in aqueous solution, was also added to the pulp slurry prior to sheet formation in an amount equal to 0.125% of the dry weight of the pulp. Test results are shown in Table III below

TABLE III

| Handsheets of Example | Hercules Size Test to 80% Reflectance | |
|---|---|---|
| | Off-The-Machine | Natural Aged |
| 17 | 18 | 90 |
| 18 | 62 | 75 |

"Off-the-machine" sizing is important to the paper maker. A sufficient degree of water resistance on the first section of the dry part of a paper machine ("off-the-machine" sizing) is required to facilitate the application of aqueous emulsions or dispersions of on-machine coatings. If sizing is not adequate at this point, there is an excessive pickup of water and, with a lightweight sheet, the possibility of a serious weakening of the web. There is also the need to drive off the excess water which adds to the load of the after-dryers, thereby increasing the consumption of steam and restricting the speed of the machine.

Several cationic resins were employed in combination with an alkyl ketene dimer, a hydrophobic cellulose reactive agent, as indicated in Example 19 below.

EXAMPLE 19

An aqueous alkyl ketene dimer emulsion was prepared as in Example 4. Portions of the emulsion were employed to prepare aqueous sizing compositions comprised of 0.10% alkyl ketene dimer and 0.10% water-soluble cationic resin as shown in Table IV below. These sizing compositions were applied to the surface of a sheet of 40 lb./3000 ft.$^2$ water leaf paper by the method set forth immediately following Example 12 above. The paper sheet was made from a 50:50 hardwood-softwood pulp blend on a pilot paper machine. Test results are shown in Table IV below.

TABLE IV

| Cationic Resin | Hercules Size Test to 80% Reflectance | |
|---|---|---|
| | Off-the-Machine[1] (seconds) | Natural Aged[2] (seconds) |
| (a) None | 0 | 1060 |
| (b) Polyaminopolyamide-epichlorohydrin resin - 1.3 moles epichlorohydrin per mole of secondary nitrogen of the polyaminopolyamide-polyaminopolyamide derived from adipic acid and diethylene triamine | 0 | 1464 |
| (c) Same as (b) above except 0.3 mole epichlorohydrin used instead of 1.3 moles | 2 | 1250 |
| (d) Methylbisaminopropylamine-epichlorohydrin resin | 2 | 1500 |

TABLE IV-continued

| Cationic Resin | Hercules Size Test to 80% Reflectance | |
|---|---|---|
| | Off-the-Machine[1] (seconds) | Natural Aged[2] (seconds) |
| (1:5 mole ratio) | | |
| (e) Resin derived by reaction of 90 parts acrylamide and 10 parts dimethyl-diallylamine hydrochloride | 0 | 1185 |
| (f) 1:1 molar condensation product of 1,4-dichlorobutane and tetramethyl-1,3-propane diamine | 0 | 1284 |
| (g) Resin of Example 1 | 199 | 1340 |
| (h) Resin derived by reacting epichlorohydrin with the 1:1 mole reaction product of dicyandiamide and diethylenetriamine 1.2 moles of epichlorohydrin per mole of secondary nitrogen of the reaction product | 175 | 1600 |
| (i) Poly(dimethyldiallyl-ammonium chloride) - available commercially as Calgon 261 | 2 | 1120 |

[1]Sheet dried at 200° F. for 20 seconds to a moisture content of 5% - sizing measurement made within a minute after that time.
[2]Natural aged-sizing measurement made after 7 days at room temperature (about 25° C.).

It is to be understood that the above description and working examples are illustrative of this invention and not in limitation thereof.

What I claim and desire to protect by Letters Patent is:

1. A sizing composition for cellulose fibers consisting essentially of an aqueous emulsion of a hydrophobic cellulose reactive sizing agent selected from the group consisting of ketene dimers, acid anhydrides, and organic isocyanates containing a sizing accelerator, said sizing accelerator being selected from a water-soluble poly(diallylamine)-epihalohydrin resin and a water-soluble poly(N-methyldiallylamine)-epihalohydrin resin in an amount sufficient to increase the off-the-machine sizing effect of the sizing agent, the amount of epihalohydrin used in reaction with the poly(diallylamine) being from about 0.5 mole to about 1.5 moles per mole of secondary amine present in the polymer and the amount used in reaction with the poly(N-methyldiallylamine) being from about 0.5 mole to about 1.5 moles per mole of tertiary amine present in the polymer.

2. The sizing composition of claim 1 wherein the sizing agent is a ketene dimer and the sizing accelerator is poly(N-methyldiallylamine)-epichlorohydrin resin and the amount of epichlorohydrin used in reaction with the poly(N-methyldiallylamine) is from about 1 mole to about 1.5 moles per mole of tertiary amine present in the polymer.

3. The sizing composition of claim 1 wherein the sizing agent is an acid anhydride and the sizing accelerator is poly(N-methyldiallylamine)-epichlorohydrin resin and the amount of epichlorohydrin used in reaction with the poly(N-methyldiallylamine) is from about 1 mole to about 1.5 moles per mole of tertiary amine present in the polymer.

4. The sizing composition of claim 1 wherein the sizing agent is an organic isocyanate and the sizing accelerator is poly(N-methyldiallylamine)-epichlorohydrin resin and the amount of epiclorohydrin used in reaction with the poly(N-methyldiallylamine) is from about 1 mole to about 1.5 moles per mole of tertiary amine present in the polymer.

* * * * *